United States Patent [19]

Nagao et al.

[11] 3,797,943

[45] Mar. 19, 1974

[54] SURFACE INSPECTING APPARATUS

[75] Inventors: Yukio Nagao; Chiaki Fukazawa, both of Tokyo, Japan

[73] Assignee: Tokyo Shibawa Electric Company, Ltd., Saiwai-ku, Kawasaki-shi, Kanagawa-ken, Japan

[22] Filed: Aug. 21, 1972

[21] Appl. No.: 282,222

[30] Foreign Application Priority Data
Aug. 31, 1971 Japan.............................. 46-66877

[52] U.S. Cl. .......... 356/200, 250/219 DF, 356/209, 356/212, 356/237
[51] Int. Cl. ............................................ G01n 21/32
[58] Field of Search ........... 356/199, 200, 212, 209, 356/237, 238, 120; 250/219 DF

[56] References Cited
UNITED STATES PATENTS
| | | | |
|---|---|---|---|
| 3,257,563 | 6/1966 | Laurent | 250/219 DF |
| 3,058,004 | 10/1962 | Domizi et al. | 250/219 DF |
| 3,334,238 | 8/1967 | Heimbold | 356/200 X |

Primary Examiner—Ronald L. Wibert
Assistant Examiner—F. L. Evans
Attorney, Agent, or Firm—Oblon, Fisher, Spivak, McClelland & Maier

[57] ABSTRACT

A surface inspecting apparatus is provided and includes a light source which illuminates the surface of an object to be inspected.

A slit plate having a plurality of slits of different shape which determine the field of vision for the object is provided and is arranged in the path of the reflected light from the object to be inspected. A plurality of photo-electric conversion devices are provided for converting the reflected light from the object to be inspected which passes through the slits. Further means are provided for scanning the field of vision. By detecting the change of the light quantity of the reflected light from the object to be inspected which passes through the slits by the photo-electric conversion devices, it can be readily determined whether defects in the object to be inspected exist or not. Also by comparing the output of each of the photo-electric conversion devices, the shape of any defect can be determined.

6 Claims, 14 Drawing Figures

PATENTED MAR 19 1974 3,797,943
SHEET 3 OF 4
FIG. 6
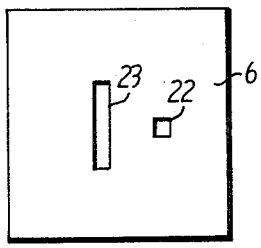
FIG. 8
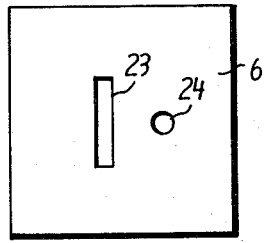
FIG. 9
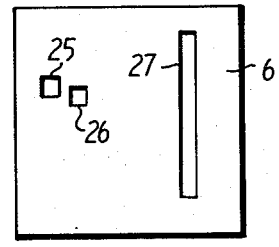
FIG. 10

3,797,943

SURFACE INSPECTING APPARATUS

BACKGROUND OF THE INVENTION

1. Field of the Invention

This invention generally relates to a surface inspecting apparatus and more particularly to a surface inspecting apparatus for inspecting the existence of defects such as stains, flaws, cracks, deformations or the like which may appear on the outer surface of an object being inspected.

2. Description of the Prior Art

Serious surface defects often develop on a variety of engineering materials produced in sheet form such as steel sheets, plated steel sheets, stainless steel sheets, aluminum sheets, sheets of glass, paper, plastics, and many others. Because of such defects, it is necessary to inspect the finalized product to determine whether certain impairments such as stains, flaws, cracks, deformations or the like, exist on the surface thereof.

In the past, such surface defects were usually detected by visual inspection. It is widely known, however, that man's ability to visually inspect defects in objects depends heavily on unknown areas of his brain, which control his ability to recognize patterns, his intuition, and the like. Moreover, with today's level of technology, it is impossible for man to visually inspect to the degree of accuracy needed. Additionally, the non-automated individual inspecting process consumes a great deal of time.

SUMMARY OF THE INVENTION

Accordingly, it is a primary object of this invention to provide a new and improved unique apparatus which is capable of quickly and relatively inexpensively inspecting the defects of objects with great accuracy.

Another object of this invention is to provide a new and improved unique apparatus which can accomplish automatic inspection which eliminates the need for slowing down a production line, sharply saves on labor costs and increases production.

Still another object of this invention is to provide a new and improved unique apparatus which is capable of identifying the types or the shapes of any defects present.

Briefly, in accordance with the present invention the foregoing and other objects are attained by the provision of a surface inspecting apparatus which uses means for illuminating the surface of an object to be inspected. A slit plate having a plurality of slits of different shape is provided and is arranged in the path of the reflected light from the object to be inspected, said slits determining the field of vision for the object to be inspected.

A plurality of photo-electric conversion devices are further provided for converting the reflected light from the field of vision of the object to be inspected which passes through the slits such that any defects can be readily determined. A plurality of comparators are still further provided for enabling the shape of any detected defect to be accurately otained.

BRIEF DESCRIPTION OF THE DRAWINGS

A more complete appreciation of the invention will be obtained as the same becomes better understood by reference to the following detailed description when considered in connection with the accompanying drawings wherein:

FIG. 6 shows an illustrating view for illustrating the relation between the slit of the apparatus of this invention and defects of an object to be inspected;

FIG. 8 shows an enlarged partial view of the slit plate shown in FIG. 7;

FIGS. 9 through 11 show other examples of suitable slit plates for use in the surface inspecting apparatus of FIGS. 1 and 7.

DETAILED DESCRIPTION OF THE PREFERRED EMBODIMENTS

Figure 1:
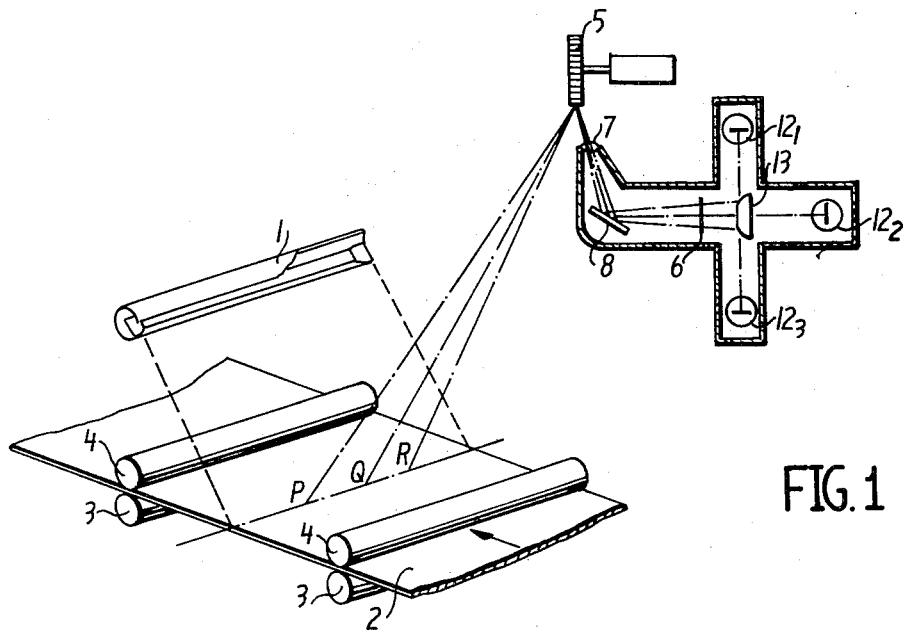
FIG. 1 shows a schematic view of a surface inspecting apparatus according to a preferred embodiment of this invention.

The surface inspecting apparatus of this invention will now be described with reference to FIGS. 1 through 11 wherein like reference numerals designate identical or corresponding parts throughout the several views.

Referring now to FIG. 1, the surface inspecting apparatus of the present invention is shown as including a light source 1 which illuminates the surface of an object 2, for example, steel sheets which are to be inspected. The object 2 may be forwarded by feeding rollers 3 and 4 in the direction shown by an arrow. The light source 1 may be, for example, a mercury arc lamp, an iodine vapor lamp, a fluorescent lamp, a sun beam lamp, an infrared ray lamp, or the like.

Figure 2:
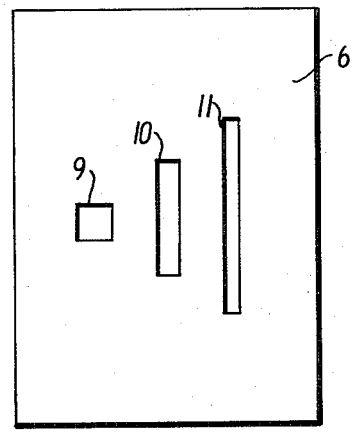
FIG. 2 shows an enlarged partial view of the slit plate shown in FIG. 1.
Figure 3:
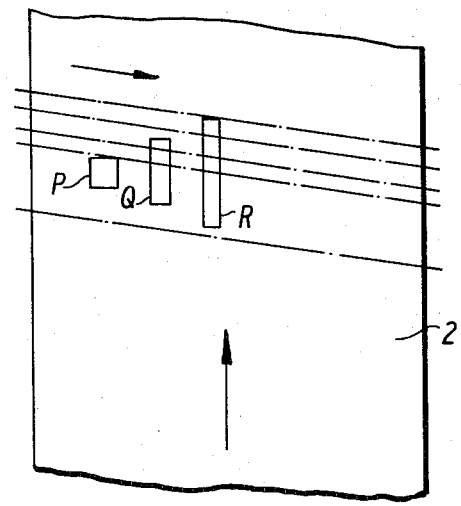
FIG. 3 shows a scanning mode of the apparatus shown in FIG. 1.

The light reflected by the surface of the object 2 is again reflected by a rotary mirror 5 and the strip image thereof is focused on a slit plate 6 by a lens 7 and a mirror 8. The slit plate 6 is made of, for example, a non-transparent material and has a plurality of slits, for example, three polygon slits, that is, a square slit 9, a rectangle slit 10 and a rectangular strip slit 11, as shown in FIG. 2. The slits 9, 10 and 11 determine the field of vision for the object 2 which is to be inspected. FIG. 3 shows the field of vision P, Q, and R for the object 2 which are respectively determined by the slits 9, 10 and 11. Since the slits determine the field of vision, their shape must be carefully determined. One example for the size of the square slit 9 is 1 mm × 2 mm, for the rectangle slit 10 is 0.5 mm × 10 mm and for the rectangular strip slit 11 is 0.5 mm × 20 mm. Referring again to FIG. 1, it is seen that the light flux which passes through the slits 9, 10 and 11 of the slit plate 6 is incident upon photo-electric conversion devices $12_1$, $12_2$ and $12_3$, for example, photomultiplier tubes or photodiodes through a prism 13, and thereby converted into corresponding electrical signals. The rotary mirror 5 may be, for example, either an octahedron or a 20-hedral body and made of glass or metal. The 20-hedral mirror can perform high-speed scanning, although its visibility is narrowed. The metal mirror can attain higher rotational speeds and produce a larger surface of reflection than the glass mirror.

Now, suppose that the rotary mirror 5 is at rest. The light flux which is incident upon the photo-electric conversion devices $12_1$, $12_2$ and $12_3$ is reduced by the slits 9, 10 and 11 until it is limited to the light coming from a microscopic area, that is for example, the field of vision at P as shown in FIG. 1. When the rotary mirror 5 is rotated, the position of the field of vision shifts from P to Q and then to R, so that the surface of the object 2 is optically scanned. In the case where the object 2 are sheets such as steel sheets, glass sheets, paper sheets, plastic sheets or the like, the same are usually forwarded in a direction which is at right angles to the scanning direction, so that the position of the field of vision on the sheets will travel along the length of the sheets. Since the slit plate 6 has differently shaped slits, the light fluxes from P, Q and R respectively cen enter the photo-electric conversion devices $12_1$, $12_2$ and $12_3$. By rotating the rotary mirror 5, the points P, Q and R are made to scan the object 2 along its width so that each of the photo-electric conversion devices $12_1$, $12_2$ and $12_3$ delivers a defect output corresponding to each field of vision. If the relation between the travelling speed of the sheet, size of the field of vision, and the scanning speed is proper, the entire surface of the sheet can be completely inspected. When the surfce of the object 2 being inspected is uniformly illuminated, any part of the surface having defects will exhibit reflection characteristics which differ from those exhibited by a normal surface area. The differing characteristics will occur, since any defective part of the surface will cause the illuminating light to be diffused, reflected in one direction, or absorbed by the defective part. Thus, when the object 2 being inspected is defective, the quantity of reflected light changes, so that the output of the photo-electric conversion devices $12_1$, $12_2$ and $12_3$ may change accordingly. Sometimes, the outputs of the photo-electric conversion devices $12_1$, $12_2$ and $12_3$ will exhibit output voltage variations even in a defectless part of the object. This output change may be caused by changes in texture which are not defects. Accordingly, it is desirable to provide a signal processing circuit which can distinguish between output changes in the photo-electric conversion devices which result solely from defects and to reject any changes resulting from change in texture or the like.

Figure 4:
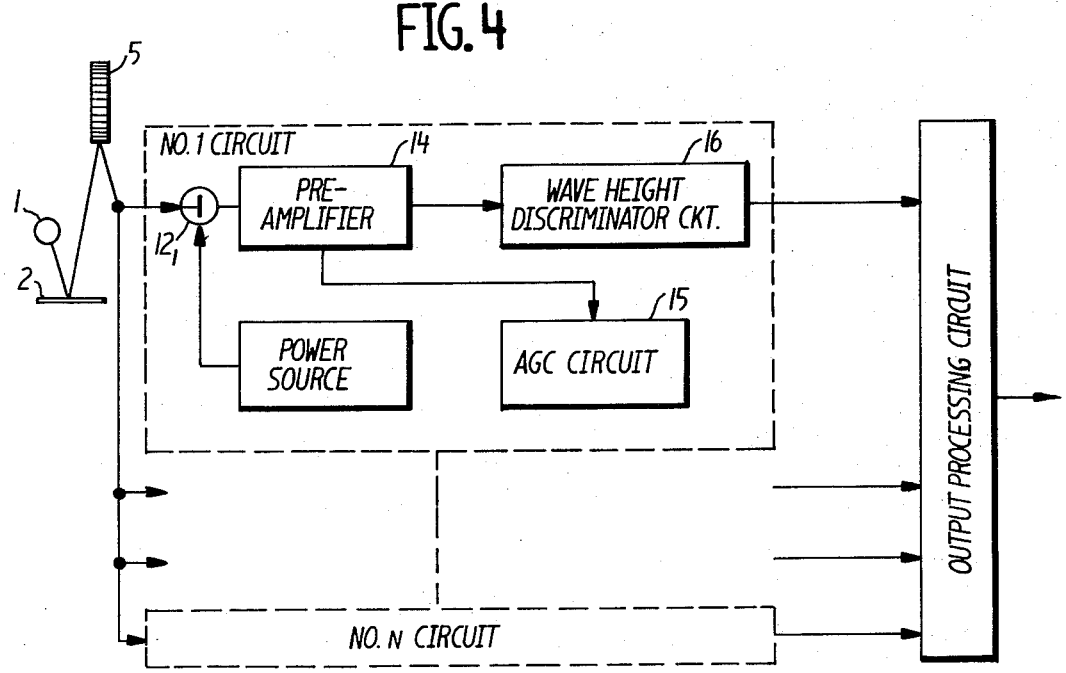
FIG. 4 shows a block diagram of the signal processing circuit of the surface inspecting apparatus according to a preferred embodiment of this invention.

FIG. 4 shows one example of such a signal processing circuit. According to this circuit, the light which enters the first photo-electric conversion device $12_1$ is converted into an electrical signal which, after being amplified by a preamplifier 14, is supplied to an AGC circuit 15 and a wave height discriminator circuit 16. The AGC circuit 15 adjusts the high-tension source voltage for use in the photo-electrical conversion device $12_1$ and maintains the average level of the preamplifier output at a constant value. The wave height discriminator circuit 16 may be either of a differential type or anintegral type, both types being well known in the art. The principle of operation of the wave height discriminating circuit is known in the art and will not be discussed in detail, except to state that this circuit descriminates between a signal due to actual defects in the object being inspected and other signals. A separate signal processing circuit, as described above, is provided for each photo-electric conversion device. Thus, the signals from the photo-electric conversion devices $12_2$ and $12_3$ may also be processed as in the case of the photo-electric conversion device $12_1$. The output of each of the discriminator circuits 16 indicates any defect of the object 2.

However, in order to provide a higher degree of identification, each output of the separate signal processing circuits is combined for processing, that is, each output is supplied to an output processing circuit. This output processing circuit may consist of, for example, conventional AND/OR logic circuits.

Figure 5A:
FIGS. 5a through 5d show wave forms for illustrating the operation of the apparatus of this invention.
Figure 5B:
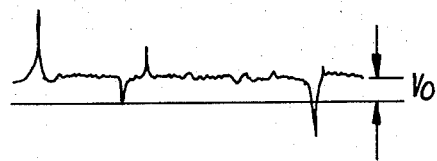
Figure 5C:
Figure 5D:

FIGS. 5a–5d show an example of a typical output waveform for the signal processing circuit hereinabove described. The output waveform of one of the photo-electric conversion devices $12_1$, $12_2$, or $12_3$ may be as shown in FIG. 5(a). When the object 2, for example, the sheet being inspected is defective, the quantity of the output of the preamplifier 14 will change. In the case of a specular reflection, the quantity will decrease as shown in FIG. 5(a). FIG. 5(b) shows an output waveform of the differential type discriminator circuit 16. The voltage Vo indicates the discriminating level. As can be clearly understood from the waveform shown in FIG. 5(b), the defective part causes an abrupt change in the output. FIG. 5(c) shows the output waveform of FIG. 5(b) after undergoing discrimination provided by Vo. FIG. 5(d) shows the defect signal waveform after removing the end signal of FIG. 5(c). By detecting the signals at the output of the conversion devices and processing the same as described in connection with FIGS. 5a–5d, it can readily be determined whether or not defects exist on the surface of the object.

Now, the advantages of this invention will now be described in detail.

Supposing that Lo denotes the quantity of reflected light in the case wherein the field of vision is on the defectless part of the object 2 and L denotes the quantity of reflected light in the case wherein the field of vision is on the defective part of the object 2. Lo and L can then be represented by the following expression.

$$Lo = K.a.S. \qquad (1)$$

$$L = K[a(S-S') + bS'] \qquad (2)$$

where
- S: are of field of vision in mm$^2$
- S': area of defect within the field of vision in mm$^2$

- a: reflection characteristic of the light reflected from the defectless part of the object, as converted into a voltage value
- b: reflection characteristic of the light reflected from defective part of the object as converted into a voltage value, and
- K: coefficient of amplification of the electronic circuit. From the equations (1) and (2), the changing rate of the reflected light $\alpha$ when the field of vision is moved to the defective part of the object can be expressed as follows:

$$\alpha = (Lo-L)/Lo$$
$$= a - b/a \cdot S'/S \qquad (3)$$

Since for the same defect, a and b are identical, it can clearly be understood that in the expression (3) $\alpha$ is determined by the ratio of the defective area to the field area. FIG. 6 shows the relation between the particular slit of the slit plate 6 and the defect. As can clearly be understood from FIG. 6 and the equation 3, if the defect is a small round spot 20 and is within the square field of vision which is determined by the square slit 9 then $\alpha$ will be at a maximum value which means a high inspecting sensitivity. Now, if the same defect 20 is within the rectangular field of vision which is determined by the rectangle slit 10 then $\alpha$ will be at a medium value and if the defect 20 is within the rectangular strip field of vision which is determined by the rectangular strip slit 11 then $\alpha$ will be at a minimum value which means the lowest inspecting sensitivity. On the contrary, if the defect is a long and narrow one as shown by numeral 21 in FIG. 6 then the inspecting sensitivity will provide an opposite result, that is, the square slit 9 will be at the lowest sensitivity and the rectangular strip silt 11 will be at the highest sensitivity. Thus, when the same defect is observed through differently shaped slits, the output varies for each slit.

However, if the slits 9 and 11 are of identical shape or size, then the output will be same and will result in a low inspecting rate of any defects. By changing the shape of the slits 9 and 11, as explained hereinabove, the output can be varied for each slit. For this reason, it is possible to inspect a particular defect with high sensitivity and to identify the types of defects by comparing their outputs with each other to a certain extent. Thus, this invention can provide uniform detection of defects regardless of their size. It should be understood that the size of the field of vision is closely related to the surface defect detecting sensitivity. When the size of the field of vision is diminished, the amount of variation in the signal for the same defect is increased and as a result, the level of detecting ability is enhanced. But it is also necessary to note the fact that the quantity of incident light will decrease, therefore, the field of vision cannot be reduced without limit. In addition, when the apparatus handles various types of defects, its detecting ability will be greatly affected not only by the size of the field of vision, but also by its shape. Thus, the most efficient slit for the defects of the object to be inspected must be selected.

While in the above embodiment, a three slit type slit plate was used, it should be apparent that numerous other types and numbers may be readily used.

Figure 7:
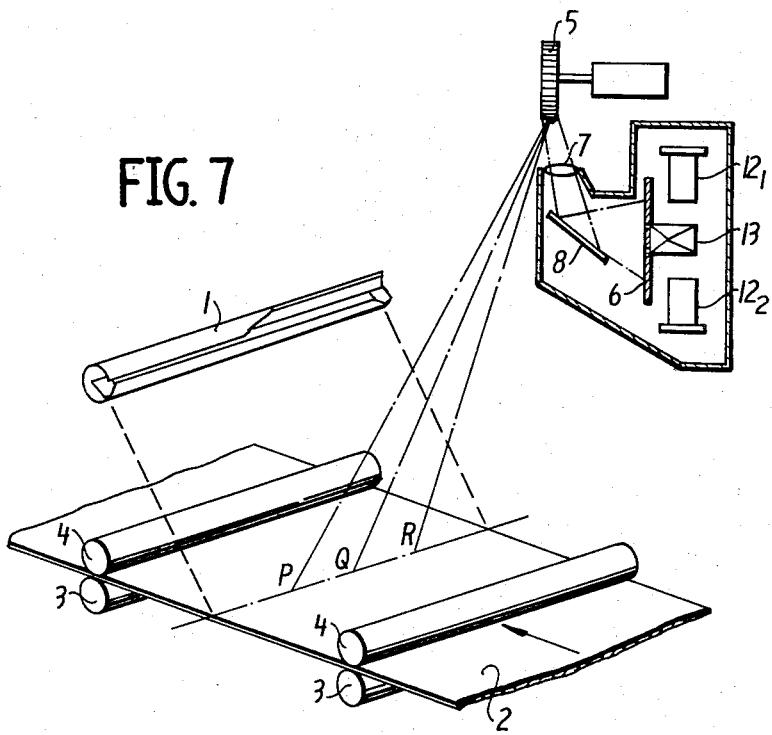
FIG. 7 shows a schematic view of a surface inspecting apparatus according to another embodiment of this invention.

FIG. 7 shows another embodiment of the surface inspecting apparatus of this invention. In this embodiment substantially the same parts as those of the foregoing embodiments are denoted by the same reference numerals and accordingly the description thereof is omitted. As shown in FIGS. 7 and 8, the slit plate 6 has two slits, that is, the square slit 22 and the rectangular slit 23. These two slits determine the field of vision. The reflected light from the object 2 is focussed on the slit plate 6 and then passes through the square slit 22 and the rectangular slit 23. Thereafter, the reflected light which passes through the rectangular slit 23 enters the photo-electric conversion device $12_2$.

If the defect on the object 2 is a round one and is within the square field of vision, the output of the photo-electric conversion device $12_1$ will be high. On the other hand, if the defect is within the rectangular field of vision, the output of the photo-electric conversion device $12_2$ will be low. If the defect is a long and narrow one, the output of the photo-electric conversion device $12_1$ will be low, and the output of the photo-electric conversion device $12_2$ will be high.

In this embodiment, the square slit 22 of the slit plate 6 which is shown in FIG. 8 may be replaced by a round slit 24 as shown in FIG. 9.

Figure 11:
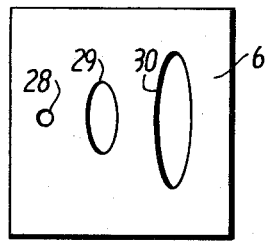

FIGS. 10 and 11 show other examples of slit plates suitable for use in the present invention. FIG. 10 shows a slit plate 6 which has two square slits 25 and 26 and a rectangular slit 27. The slits 25 and 26 are made of the same size and the position of the slit 26 is shifted from that of the slit 25. In this case, the line speed of the object to be inspected is increased and any possible oversight in the locating of any defective parts of the object to be inspected is diminished on account of the use of two square slits 25 and 26. FIG. 11 shows a slit plate 6 which has a round slit 28, a small oval slit 29 and a large oval slit 30. In this case, a similar effect as in the case of FIGS. 1 and 2 may be obtained.

It should now be apparent that the present invention as described hereinabove provides an apparatus suitable for inspecting any defects of an object, more quickly, economically and perfectly than heretofore existed. Moreover, it is apparent that this invention is advantageous in that the inspection can be performed automatically, so that the present invention is thus quite suitable for the mass production of products.

Obviously, numerous modification and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A surface inspecting apparatus comprising:
   means for illuminating the surface of an object to be inspected;
   a slit plate having a plurality of slits of different shape, said slit plate rigidly positioned in the path of the reflected light from the object to be inspected, and slits determining the field of vision for the object to be inspected;
   a plurality of photo-electric conversion devices corresponding in number to said plurality of slits, each of said photo-electric devices positioned to receive the reflected light passing through one of said slits for converting the reflected light from the field of vision of the object to be inspected into a corresponding electrical signal; and
   means for comparing said electrical signals from said plurality of photo-electric conversion devices whereby the nature of any defect detected thereby can be determined.

2. A surface inspecting apparatus according to claim 1, wherein said slit plate comprises a plurality of polygon slits of different sizes from each other.

3. A surface inspecting apparatus according to claim 2, in which said plurality of slits are composed of a square one, a rectangular one and a rectangular strip one.

4. A surface inspecting apparatus according to claim 1, in which said slit plate comprises a plurality of circular slits of different sizes from each other.

5. A surface inspecting apparatus according to claim 1, which further includes means for scanning the field of vision.

6. A surface inspecting apparatus according to claim 1, further includes means for processing an output signal of the photo-electric conversion devices, said means for processing having a preamplifier for amplifying said output of said photo-electric conversion devices and a wave height discriminator circuit for discriminating between a signal due to a defect in the object to be inspected and other signals.

* * * * *